United States Patent [19]

Barr et al.

[11] Patent Number: 5,192,247
[45] Date of Patent: Mar. 9, 1993

[54] RIDE ATTRACTION

[75] Inventors: Craig K. Barr, Tujunga, Calif.; Peter N. Alexander, Winter Park, Fla.

[73] Assignee: Universal City Studios, Inc., North Hollywood, Calif.

[21] Appl. No.: 892,402

[22] Filed: May 28, 1992

Related U.S. Application Data

[63] Continuation of Ser. No. 675,662, Mar. 27, 1991, abandoned.

[51] Int. Cl.[5] .............................................. A61G 31/16
[52] U.S. Cl. ....................................... 472/60; 472/61
[58] Field of Search .................................... 472/58-61

[56] References Cited

U.S. PATENT DOCUMENTS 3,469,837 9/1969 Heilig .
4,066,256 1/1978 Trumbull .
4,251,140 2/1981 Fogerty, Jr. .
4,642,945 2/1987 Browning et al. .

FOREIGN PATENT DOCUMENTS

425723 8/1948 Italy ........................................ 472/60
WO8302028 6/1983 PCT Int'l Appl. .................... 472/60

Primary Examiner—Richard E. Chilcot, Jr.
Attorney, Agent, or Firm—Lyon & Lyon

[57] ABSTRACT

A ride attraction has a stationary domed projection screen and a stationary projector, a plurality of motion bases with each supporting a viewer platform or vehicle. An elevator is provided for lifting the vehicle out of a staging room to a viewing position. The motion bases are mutually arranged with respect to each other such that a passenger in any vehicle can view substantially the entire screen but not any other vehicle within the theatre. Actuators beneath each vehicle move the vehicle in three dimensions in coordination with the projected motion picture.

12 Claims, 8 Drawing Sheets

RIDE ATTRACTION

This is a continuation of co-pending application Ser. No. 07/675,662, filed on Mar. 27, 1991 now abandoned.

BACKGROUND OF THE INVENTION

The field of the present invention is ride attractions.

Various ride attractions having a moving viewer platform and a motion picture or video display have been developed for use in various amusement and educational applications. For example, Heilig, U.S. Pat. No. 3,469,837, discloses an experience theatre having a concave hemispherical projection screen covering substantially the entire normal field of vision of a spectator viewing the screen from a seated position. The viewing chair in which the viewer is seated is mechanically articulated by applying controlled movement to the chair to promote awareness of body position conforming to body attitude portrayed by a particular motion picture scene. The viewer seats are arranged in a plurality of stacked levels all facing the hemispherical screen.

Manabe, U.S. Pat. No. 4,478,407, describes a monitor game machine having a cockpit or driver cabin in which a player is seated. A video monitor is positioned at the front of the cockpit and a steering device is intended to be operated by the player in response to pictures displayed on the screen of the monitor. The driver or player seat is inclined backward and forward, and right and left, in response to the movement of the steering device.

Trumbull, U.S. Pat. No. 4,066,256, discloses an amusement ride having a passenger holding frame which is supported at three locations on hydraulic rams that can tilt the frame or move it up and down. A film projector and viewing screen are connected to the frame and move with it. When the motion picture projected onto to the viewing screen simulates the view from a vehicle that is turning, the rams operate to tilt the vehicle to simulate the centrifugal forces that would typically result from such a turn. Correspondingly, the passenger holding frame is moved by the rams rapidly up or down to correspond to vertical accelerations perceived by the passenger.

Fogerty, U.S. Pat. No. 4,251,140, discloses a ride assembly for simulating travel having a housing on a moveable base which carries seated passengers. A motion picture film projector in combination with a sound system are disposed on the base and a motion picture is projected on a spherical inner surface of the housing. Motors independently drive carriage members as determined by a control circuit in order to move the base in synchronism with movement in the projected motion picture. The motion of the base is controlled to simulate a scene moving relative to and exteriorally to the housing as viewed by the passengers.

Browning, et al., U.S. Pat. No. 4,642,945, describes an entertainment structure intended to serve as a cinematic auditorium. Theatre style seating is provided o a decking support plate which may be tilted and rotated. In the presentation of a cinematic program, the viewers' perception of the action projected onto the screen is enhanced by such rotation and tilting being synchronized with the visual and sound track of the program. A control computer block can be used to effect rotation and/or tilting of the support plate.

While these and other ride attractions may offer various advantages and features, they are typically accompanied by distractions such as the presence of and movement and noise or voices from other audience members. In addition, although these known ride apparatus may have met with varying degrees of success, so far as is known, no presently available ride attraction offers the rider or passenger a unique multisensory experience with a highly realistic program due to a novel composition and combination of ride elements.

It is therefore an object of the invention to provide a novel ride attraction wherein several of the passengers' senses are simultaneously stimulated to create a realistic sensation of motion.

It is a further object of the invention to provide such a ride attraction which is capable of handling a relatively large number of passengers simultaneously.

It is yet another object of the invention to provide such a ride attraction wherein the passengers perceive only the vehicle in which they are seated and none of the other vehicles in the ride attraction theatre.

SUMMARY OF THE INVENTION

To this end, a ride attraction includes a theatre containing a projection screen, a stationary projector for projecting moving images on the screen and a motion base supporting a viewer platform. Actuators are provided for elevating the viewer platform from a staging room to a viewing position with the screen viewable from the viewer platform in the viewing position. Actuators linked to a controller move the viewer platform in coordination with the moving images projected by the stationary projector such that a sensation of movement in three dimensions in space and acceleration in these directions is perceived by the passengers.

Preferably, the viewer platform is a vehicle having an audio/video monitor. An emitter for dispersing an effects vapor such as Nitrogen gas (for a fog or cloud effect) or scented air (e.g., simulating a beach, forest, etc.) may be provided forward of the firewall and dash of the vehicle. Most desirably, the projection screen is generally spherically shaped with a high resolution image projected onto the concave viewing surface of the screen facing the passengers. A motion controller is provided for independently controlling pitch and front-/back actuators or hydraulic cylinders. The motion bases are mutually arranged with respect to each other such that a passenger can view the screen but not any other vehicle in the theatre, to enhance the realism of the viewer experience.

Preferably, a plurality of ride units are arranged on three tiers within the theatre with each ride unit having a staging room having an entrance, floor, walls, and an open ceiling. A pit or trench in the floor contains a lift joined to the motion base supporting a vehicle. The lift is actuatable to elevate the motion base from a loading position where the vehicle is substantially aligned with the floor to a viewing position where the vehicle is above and outside of the staging room. With the vehicle in the viewing position, substantially the entire screen is within the line of sight of each passenger but the other vehicles are screened from the passengers' line of sight. The distraction of the other vehicles is thereby eliminated.

A method for operating a ride attraction includes the steps of seating passengers in a plurality of vehicles on ride units arranged so that no viewer can see any other ride unit. A motion picture is projected by a stationary projector onto a stationary domed screen facing the ride units. The vehicles are moved in coordination with the projected motion picture such that the passengers perception of pitch, roll and front/back movement of the motion picture is substantially matched by the movement of the vehicle.

BRIEF DESCRIPTION OF THE DRAWINGS

Other objects and features of the present invention will become apparent from the following detailed description taken in connection with the accompanying drawings which disclose one embodiment of the invention. It is to be understood, however, that the drawings are designed for the purpose of illustration only and are not intended as a definition of the limits of the invention.

In the drawings, wherein similar reference characters denote similar elements through the several views.

DETAILED DESCRIPTION OF THE PREFERRED EMBODIMENT

Figure 1:
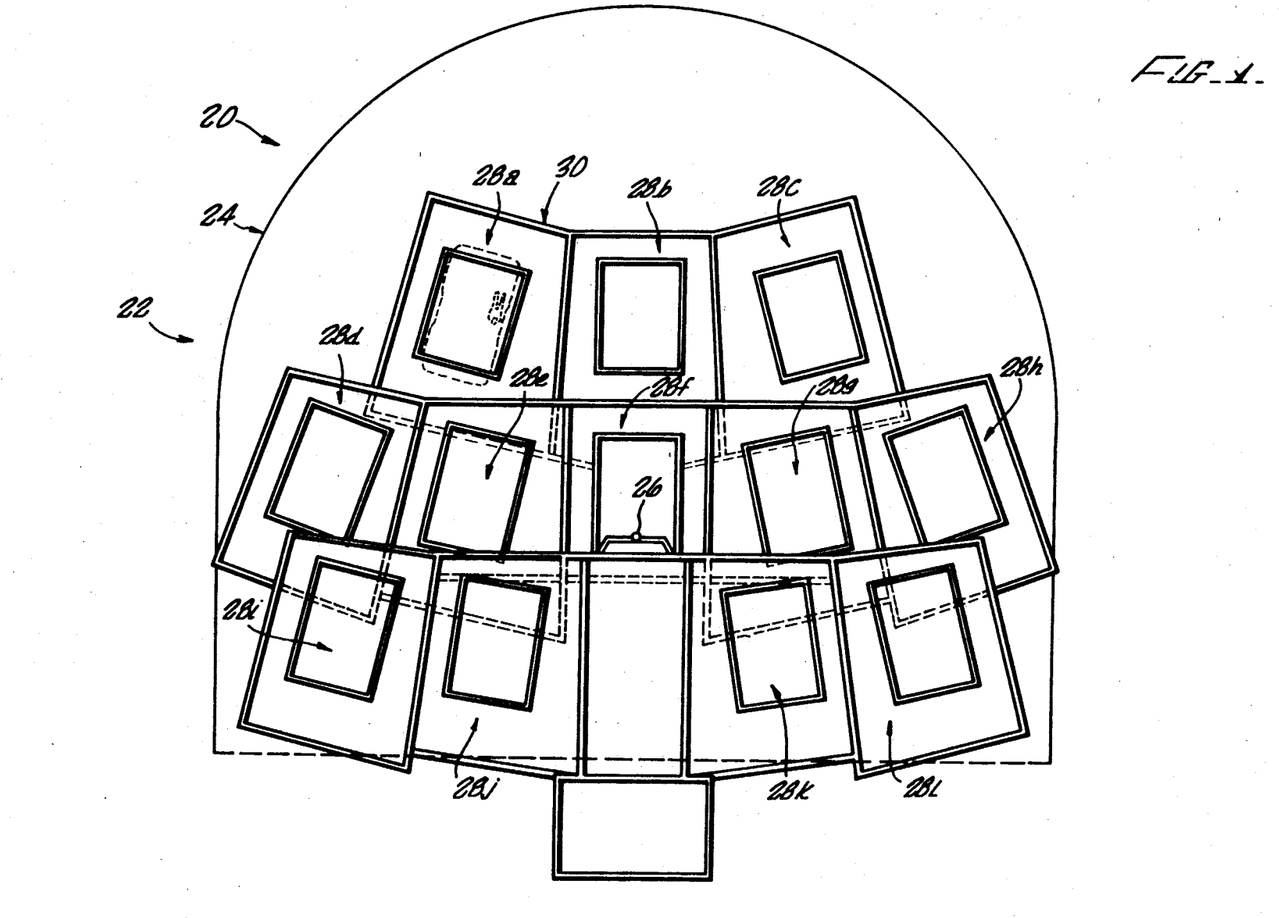
FIG. 1 is a schematic plan view of the ride attraction theatre of the invention.

Referring now in detail to the drawings, as shown in FIG. 1, the present ride attraction 20 is contained within a building or theatre 22 having a domed screen 24. A projector 27 is located at a predetermined projection point 26. The projector runs extra large (70 mm./15 p.) film using an OMNIMAX or IMAX system and projects motion pictures onto the approximately 80 foot domed screen 24. In a preferred embodiment, two theatres 22 are constructed side by side in a single building.

Figure 2:
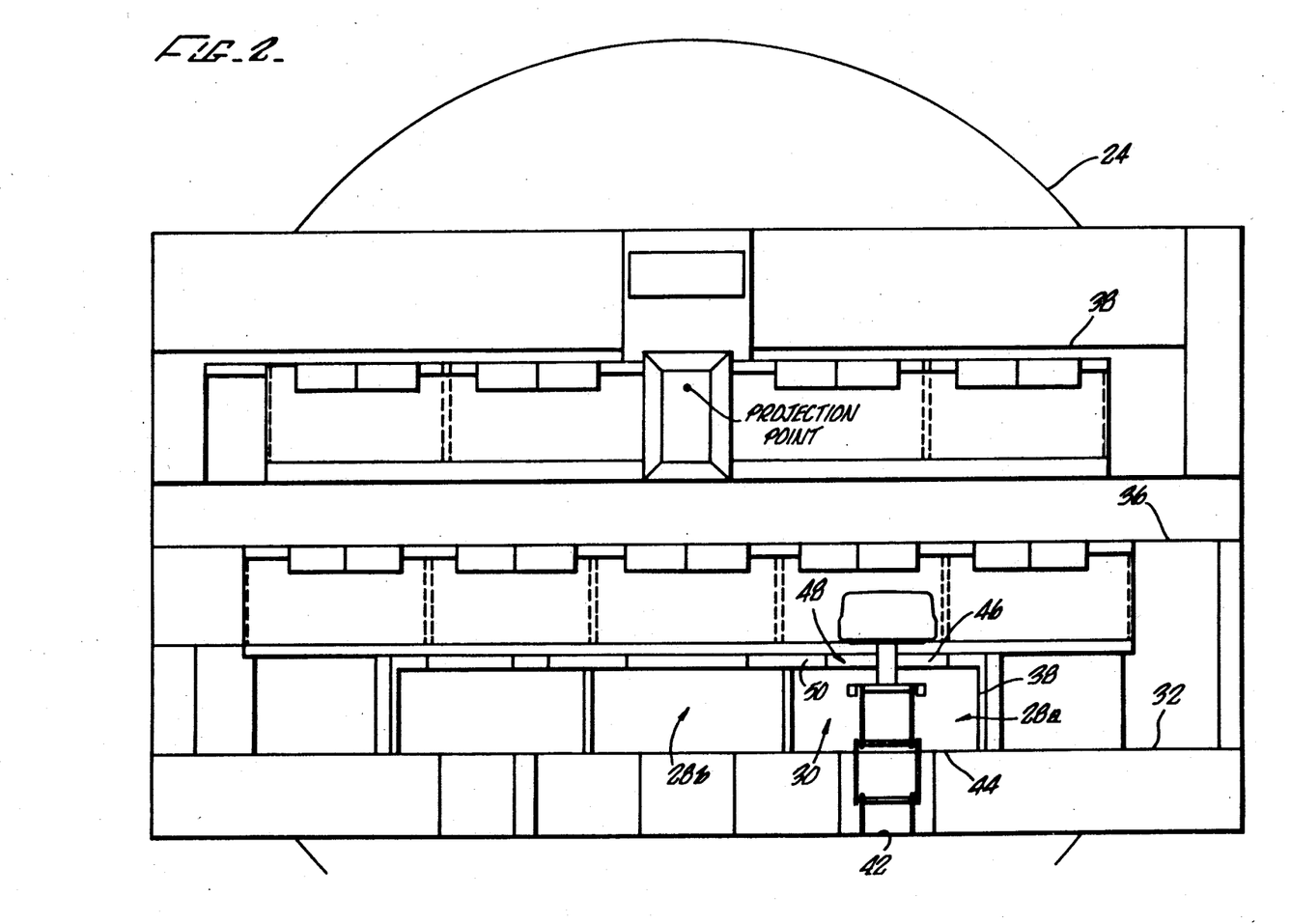
FIG. 2 is a schematic front view of the theatre.

Referring to FIGS. 1 and 2, ride units 28a-l are arranged in a vertically and horizontally staggered plan with the ride units aligned to face the center of the domed screen 24. The ride units 28a-l are arranged on a first tier 32 (containing ride units 28a-c), a second tier 36 (containing ride units 28d-h) and a third tier 36 (containing ride units 28i-l).

Figure 3:
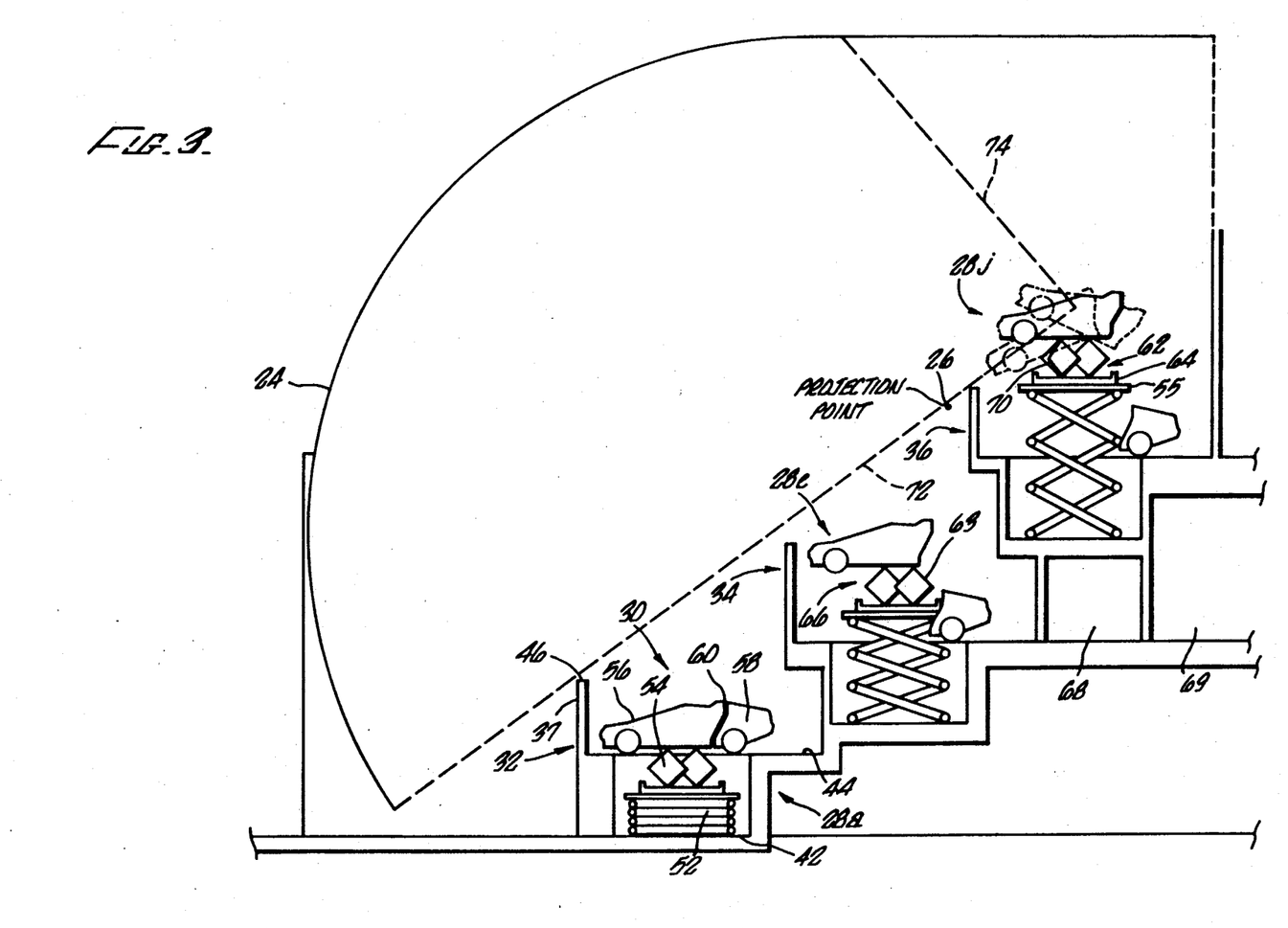
FIG. 3 is schematic side view of the ride attraction of FIGS. 1 and 2.
Figure 4:
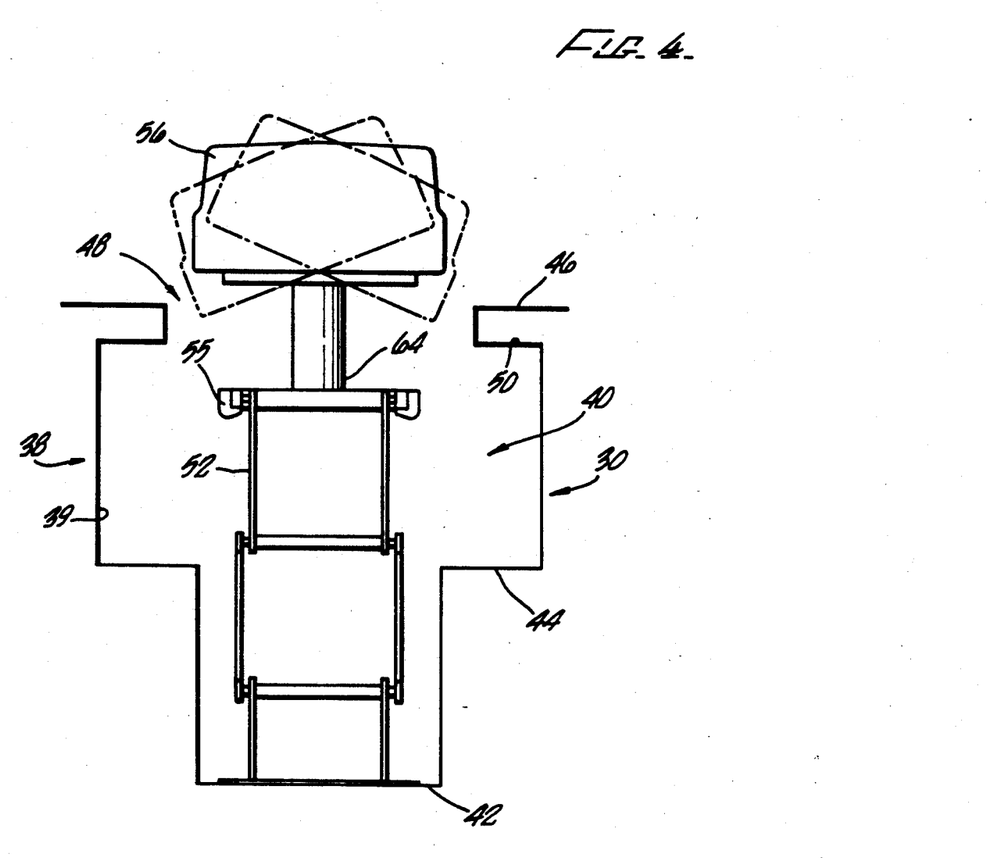
FIG. 4 is a schematic fragment front view of a ride unit.

As shown in FIGS. 3 and 4, each ride unit 28a-l has a 3-level construction 30 having a first or base level 42, a second or staging level 44, and a third or viewing level 46. A front wall 37 and exterior ride unit walls 38 define a staging room 40 at the staging level 44. A ceiling or roof 50 partially covers the top of the staging room 40 with an opening 48 in the roof 50 centrally located over the staging room 40. A lift 52 is secured on the first or ground level 42 and supports a platform 55 having a rotator 64. A motion base 62 comprising three spaced apart linear actuators or hydraulic cylinders 63 extends from the platform 55 to a vehicle 56. Each ride unit 28a-l also is associated with a waiting room 68 joined to a hallway 69 so that passengers may orderly enter into the staging room 40.

Figure 5:
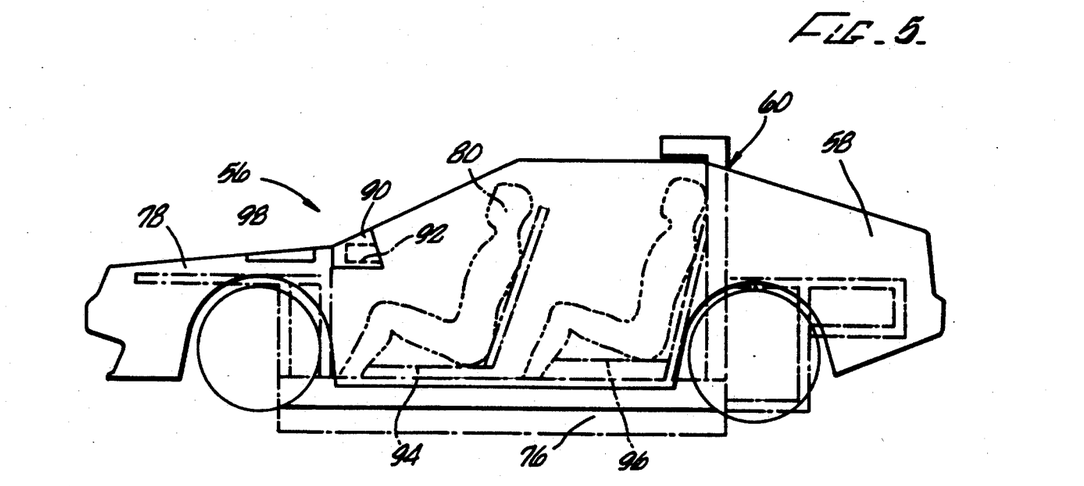
FIG. 5 is a schematic side view of the vehicle of the ride unit of FIG. 4.
Figure 7:
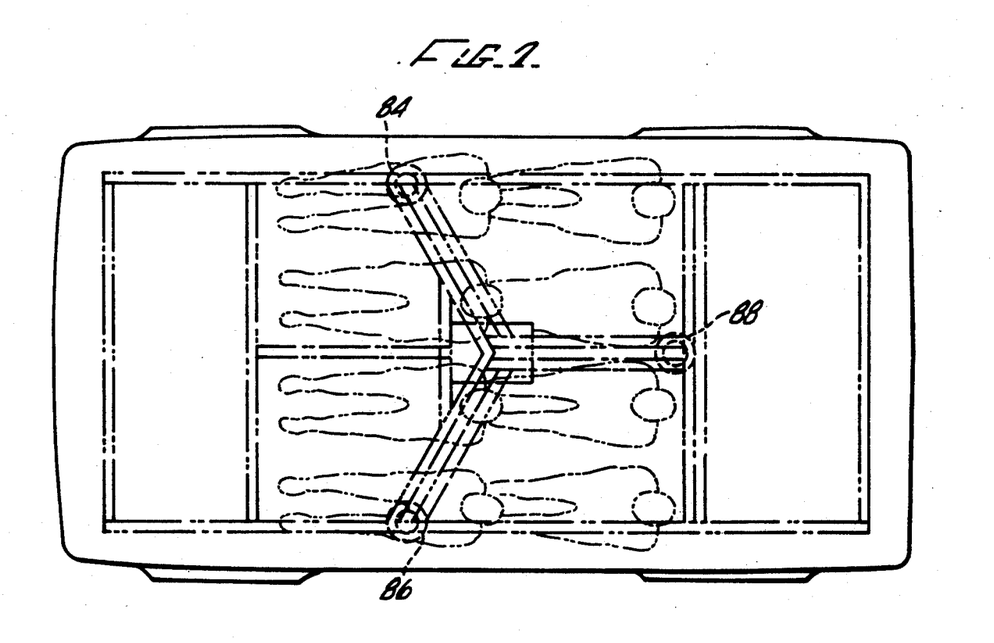
FIG. 7 is a top view thereof.

Referring to FIGS. 5 and 7, a vehicle frame 76 substantially underneath the vehicle 56 provides jacking points for attachment of the actuators 63 in a three-point triangular configuration (front jacking points 84 and 86 and rear jacking point 88). The vehicle frame 76 also supports a fiberglass vehicle body 78 representative of a sports car.

To facilitate movement of the vehicle 56, the vehicle body 78 and vehicle frame 76 have a separable back or rear portion 58 configured to match with the forward section of the vehicle 56 along a separation line 60. The separation line 60 is designed so that it is not readily perceptible or visible.

Figure 6:
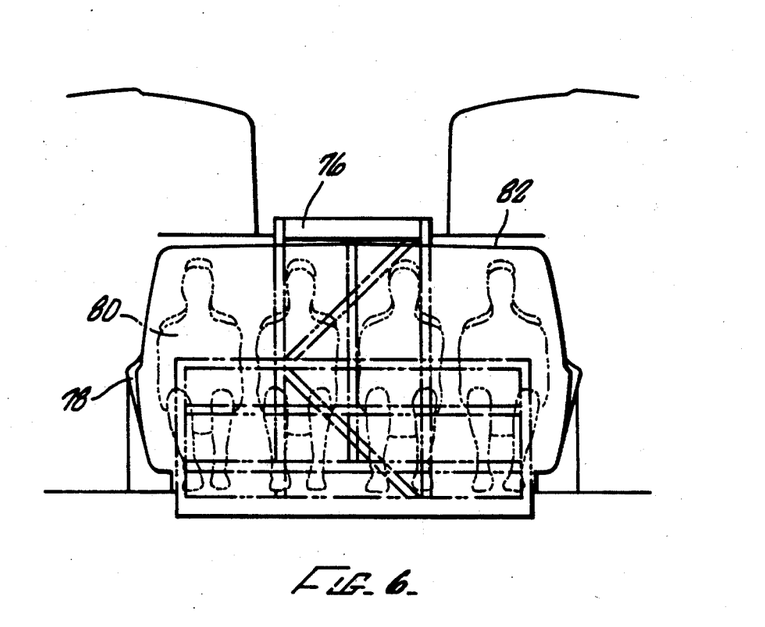
FIG. 6 is a front view of the vehicle shown in FIG. 5.

As shown in FIGS. 5-7, the vehicle 56 includes gull-wing doors 58 and a dash 90 having an audio/video monitor 92. The passengers 80 are seated four across within the vehicle 56 with the rear passengers at an elevated seating level 96 in comparison to the front passengers seating level 94. An effects generator 98 is provided on the vehicle 56 just forward of the dash 90 and provides special effects such as a Nitrogen fog, "smellovision" or scents, as well as a blower or fan to provide for "wind", to augment the passengers' ride attraction experience.

Figure 8A:
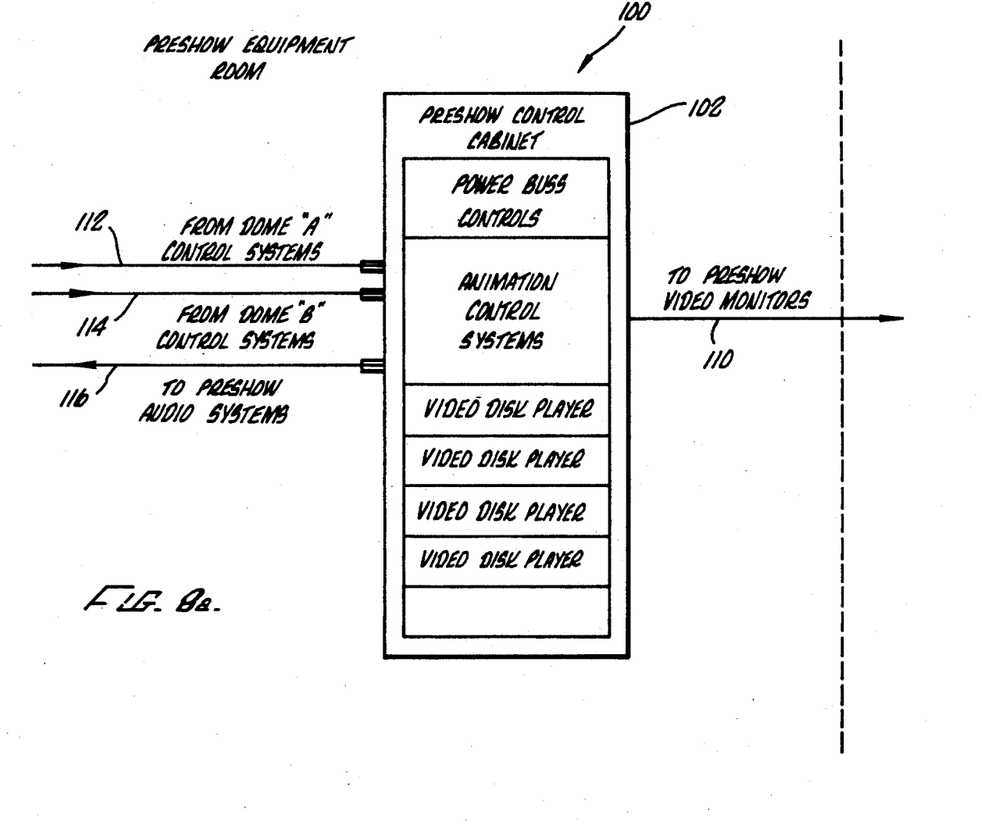
FIGS. 8a-c are schematic interconnect diagrams for the present ride attraction.
Figure 8B:
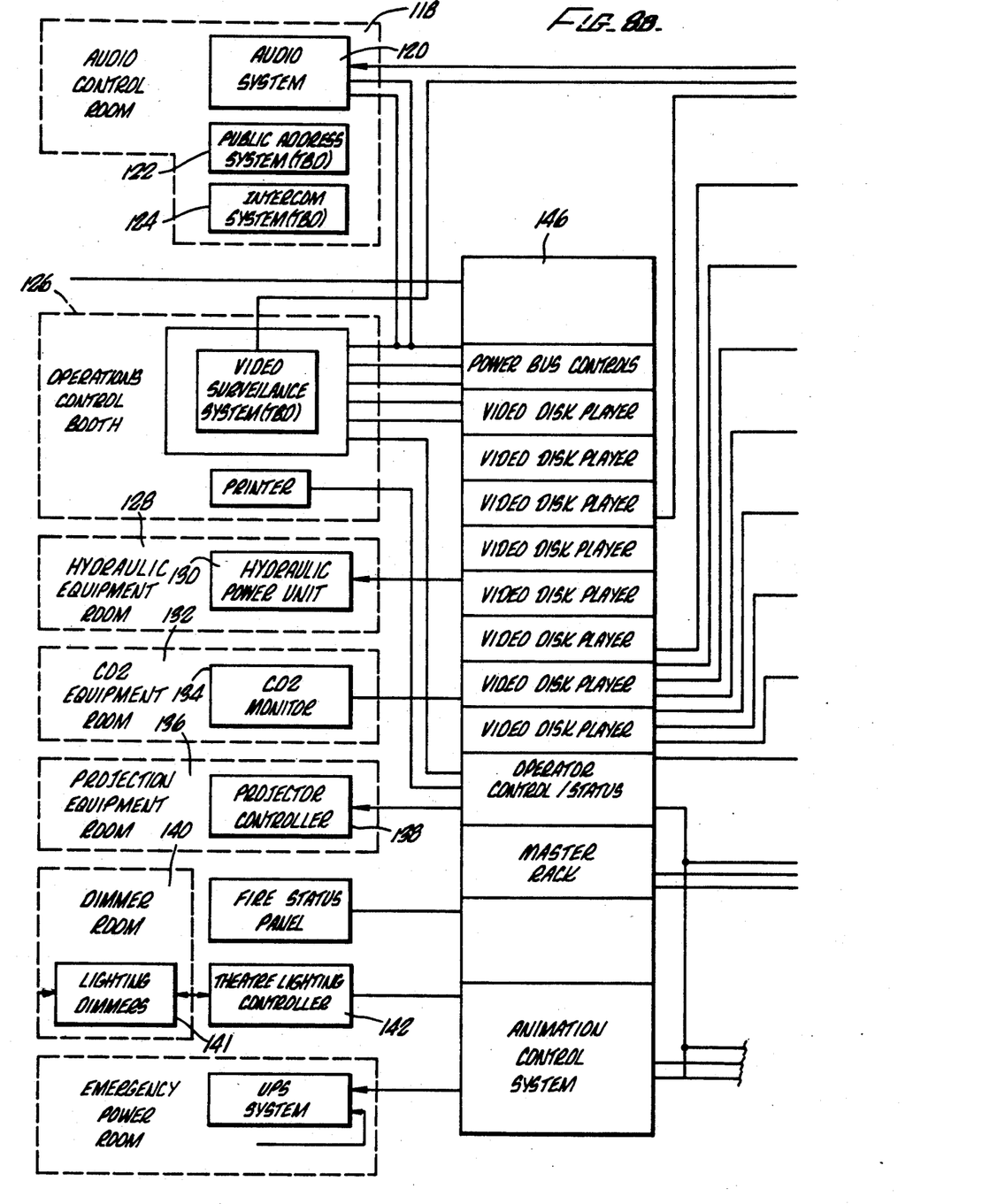
Figure 8C:
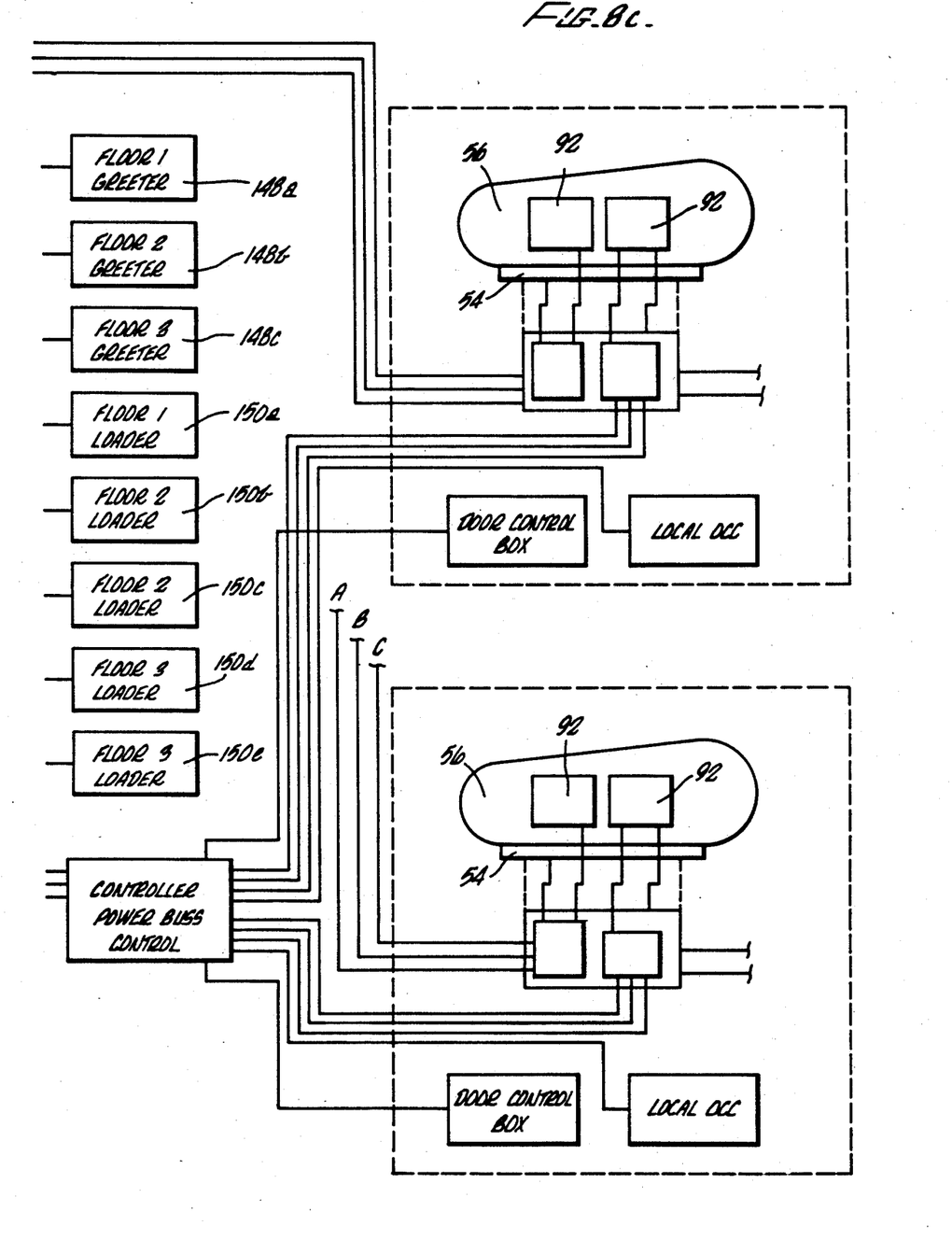

FIGS. 8a-c illustrate a preferred embodiment for controlling the ride attraction 20. As shown in FIG. 8a, a preshow equipment room 100 contains a pre-show control cabinet 102 having power controls 104, animation controls 106, and video equipment 108. A video cable 110 connects the video equipment 108 to the pre-show video monitors located in the waiting rooms 68. Similarly, audio and accessory cables 116 extend to the waiting room 68. In the embodiment having two complete ride attractions 20 within adjoining theatres 22, the controls and cables are duplicated.

As shown in FIG. 8b, an audio control room 118 contains an audio system 120, public address systems 122 and an intercom system 124, connected to the waiting room 68 and ride units 28a-l. An operation control booth 126 is provided within the theatre 22 to house the primary ride attraction controls. A hydraulic equipment room 128 having hydraulic power units 130, an $N_2$ equipment room having an $N_2$ monitor 134 and a projection equipment room 136 having an $N_2$ projection controller 138, are all linked to the operations control booth and to the ride units 28a-l. A dimmer room 140 has lighting equipment 141 and a lighting controller 142. Video disc players 146 are linked to the operations control booth 126 and the ride units 28a-l, as are floor greeters 148a-c and floor loaders 150a-e.

In operation, passengers walk through hallway 69 into the waiting room 68 associated with each ride unit 28a-l. The waiting rooms 68 include audio/visual presentations to entertain the passengers prior to experiencing the ride attraction. Passengers move, eight at a time, into the staging room 40 and are seated in the vehicle 56 while the monitors 92 within the vehicle continue with e.g. a ride related audio/visual presentation.

The staging room 40 is configured to represent a garage with the inside walls 39 of the staging room 40 having, for example, garage equipment thereon. Due to the control of the lighting and the configuration of the staging room 40, the passengers do not perceive the top opening 48, but rather perceive that the vehicle 56 is within a completely enclosed space. After the passengers 80 are seated and the doors 82 are closed, the lift 52 is activated to elevate the vehicle 56 and motion base 62 up through the opening 48 to the viewing level 46. This may be performed slowly and smoothly such that the passengers are generally unaware of the elevation of the vehicle 56.

Once at the viewing level 46, the motion picture begins and the vehicle is moved in space in coordination with the images projected onto the screen 24. Due to the configuration of the ride units 28a-l within the theatre 22, the passengers 80 within the various vehicles 56 cannot see any of the other vehicles within the theatre 22. As best shown in FIG. 3, the line of sight of any passenger with the vehicle 56 at the viewing level 46 is limited to the solid angle defined by the line of sight decline 72, the line of sight elevation 74, and the sidewalls 38 of the ride units 28a-l. The effects generator 98 emits chilled nitrogen ($N_2$) gas and/or scents or creates "wind" in timed sequence with the projected motion pictures. A sound system is provided within the vehicle to augment the physical feeling a well as audio component of the ride experience.

To create a fog effect, nitrogen ($N_2$) gas is delivered from an insulated pressurized liquid nitrogen piping system to a fog effect manifold positioned in the hood of the vehicle in front of the passenger compartment. The manifold 98, in timed sequence, sprays a fog layer around and over the passengers' heads. The fog layer is adjustable by exchanging the manifold nozzles or adjusting the system pressure. The manifold 98 has 8 or more digitally (on/off) controlled valves for releasing a fog burst.

The computer controls, as shown in FIG. 8, actuate the hydraulic cylinders 63 attached to the jacking points 84, 86 and 88. By this actuation of the hydraulic cylinders 63, the vehicle 56 may be simultaneously pitched towards the front or rear (i.e., nose up or nose down) and canted or rolled from side to side. The rotator 64 similarly provides for angular sweep or yaw movement, all in preprogrammed coordination with the projected motion pictures. As the motion picture plays, the vehicle, controlled by the motion base system, moves with the ever changing horizon line of the film. The motion bases are designed to move the vehicles in a roll of plus or minus 15 degrees and also in a pitch of plus or minus 15 degrees. At the conclusion of the ride, the lift 52 lowers the vehicle 56 back to the staging level 44. The passengers then exit through an exit hallway and the next group of passengers enters.

Thus, while only a single embodiment of the present invention has been shown and described, it will be obvious that many changes and modifications may be made thereunto, without departing from the spirit and scope of the invention.

What is claimed is:

1. A ride attraction comprising:
   a projection screen;
   a stationary projector for projecting motion pictures on said screen;
   a plurality of motion bases, each motion base supporting a viewer platform;
   means for elevating each motion viewer vehicle out of a staging room to a viewing position, said motion bases mutually arranged with respect to each other such that a viewer on any motion base can view the screen but not any other viewer platform; and
   means for moving each viewer vehicle on its respective motion base in coordination with the motion pictures.

2. The ride attraction of claim 1 wherein said plurality of motion bases are disposed on three tiers.

3. The ride attraction of claim 2 wherein three motion bases are disposed on a first tier, five motion bases are disposed on a second tier and four motion bases are disposed on a third tier.

4. The ride attraction of claim 3, wherein said first tier is nearest to and said third tier furthest from, said screen.

5. The ride attraction of claim 1 wherein each viewer entry room shares at least one interior wall with another viewer entry room.

6. The ride attraction of claim 4 wherein said motion bases are symmetrically disposed on either side of said projector.

7. The ride attraction of claim 1 further comprising a waiting room disposed adjacent to each staging room.

8. A ride attraction comprising
   a plurality of ride units arranged on at least two tiers within a ride attraction structure;
   a domed viewing screen;
   a stationary projector;
   each ride unit comprising a staging room having an entrance, floor, walls, and an at least partially openable ceiling, a pit disposed underneath the floor, a lift disposed in the pit and joined to a motion base supporting a vehicle, said lift actuatable to elevate the motion base from a loading position wherein the vehicle is substantially aligned with the floor, to a viewing position wherein said vehicle is disposed above and outside of said staging room, said motion base having means for moving the vehicle in coordination with motion pictures projected on the screen;
   said ride units arranged within said structure such that with the vehicles in their viewing positions, substantially the entire screen is within a line of sight of each vehicle and no vehicle is within a line-of-sight of any other vehicle.

9. The ride attraction of claim 8 further comprising a frame showing three spaced apart jacking points attached beneath said vehicle.

10. The ride attraction of claim 8 wherein said means for moving comprises a controller electrically linked to said projector and to first, second, third and fourth actuator drives, said first, second and third actuator drivers driving first, second and third linear elevational actuators attached to a frame supporting said vehicle in a triangular pattern thereon, for producing pitch and roll movement of said vehicle, said fourth actuator driver driving a fourth rotational actuator for producing yaw movement of said vehicle, said controller simultaneously controller said actuator drivers such that said vehicle is rotationally moved in three axes in synchronicity with the relative camera movement used to produce the motion picture.

11. A method for operating a ride attraction comprising the steps of:
    seating viewers in a plurality of vehicles on ride units arranged such that no viewer can see any other ride unit;
    projecting a motion picture onto a screen facing said ride units;
    moving the vehicles in coordination with the projected motion picture such that a viewer's perception of pitch, roll and yaw movement of the motion picture is substantially matched by pitch, roll and yaw movement of said vehicle.

12. The method of claim 11 further comprising the step of releasing a vapor in between the viewers and the screen.

* * * * *